Figure 10:
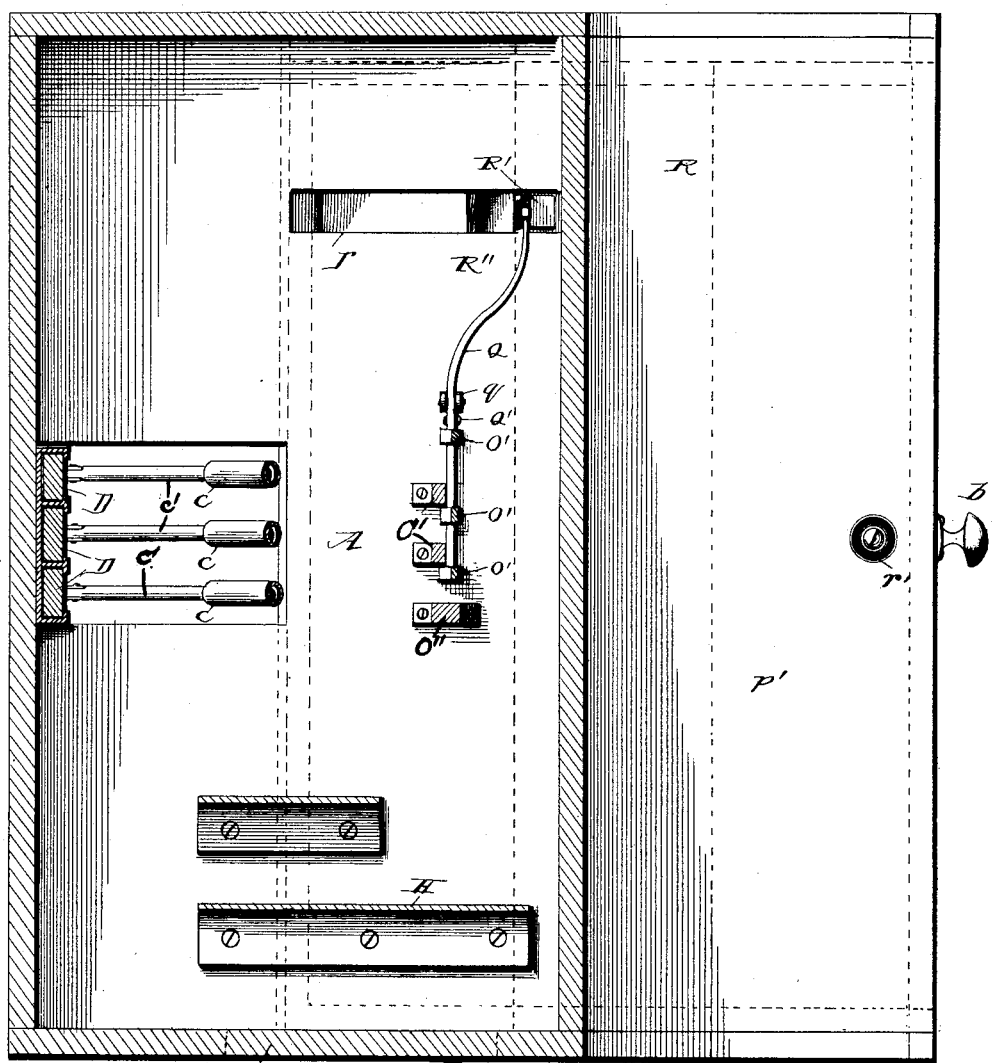

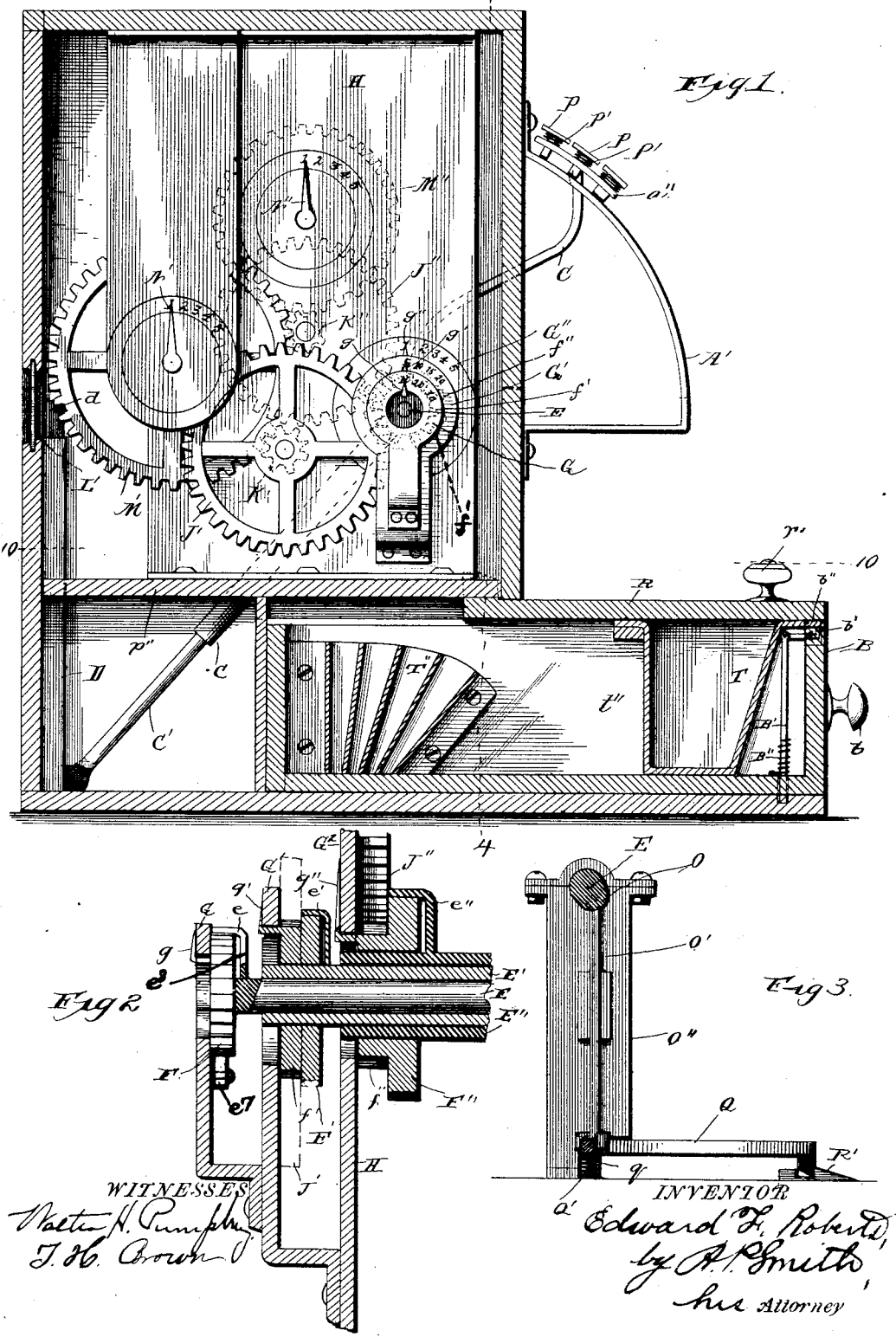

(No Model.) 9 Sheets—Sheet 2.
E. F. ROBERTS.
CASH REGISTER AND INDICATOR.
No. 481,824. Patented Aug. 30, 1892.
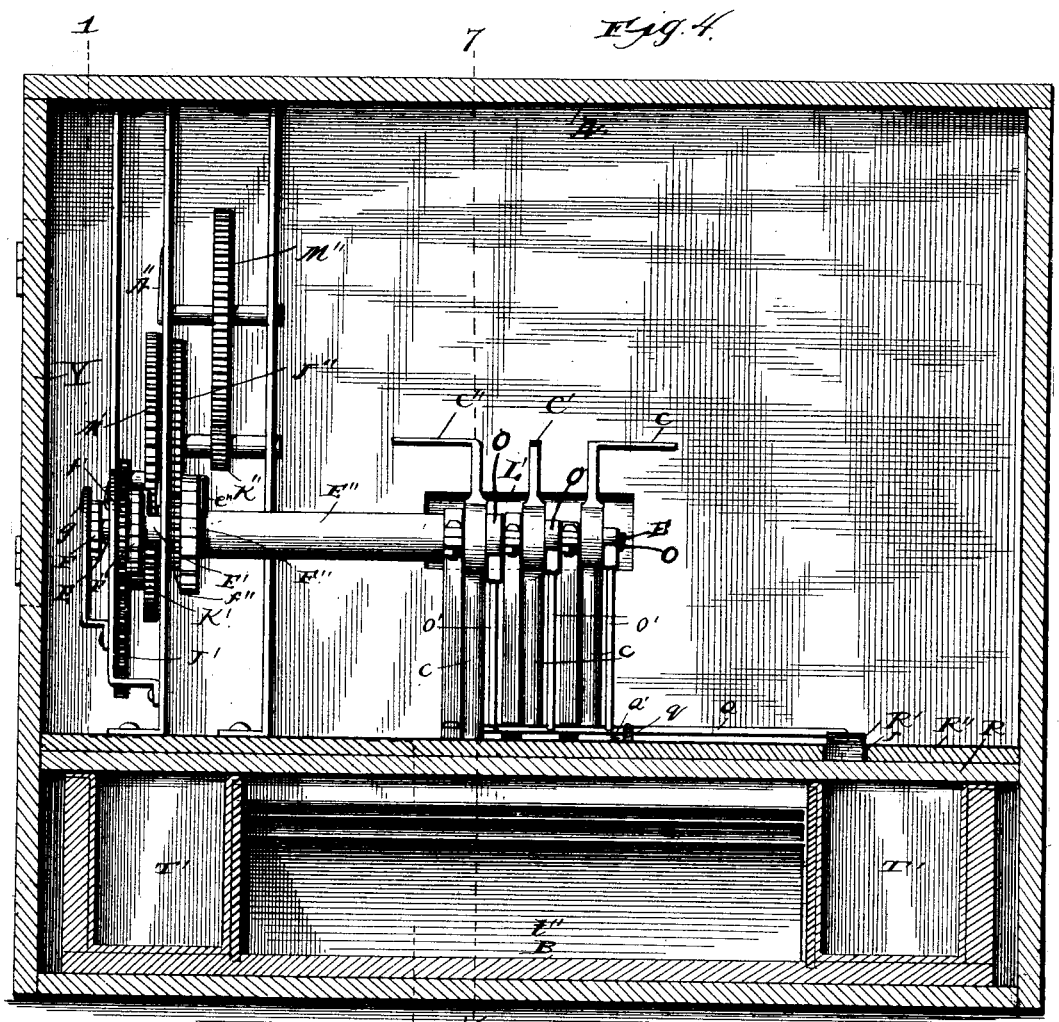
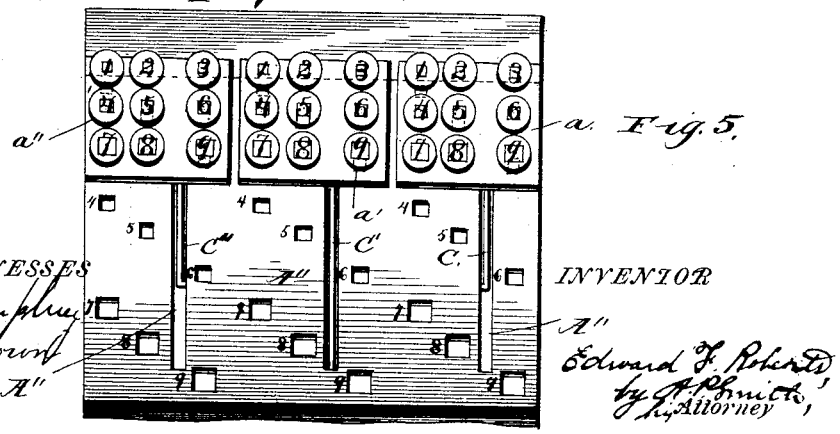

(No Model.) 9 Sheets—Sheet 3.
E. F. ROBERTS.
CASH REGISTER AND INDICATOR.
No. 481,824. Patented Aug. 30, 1892.
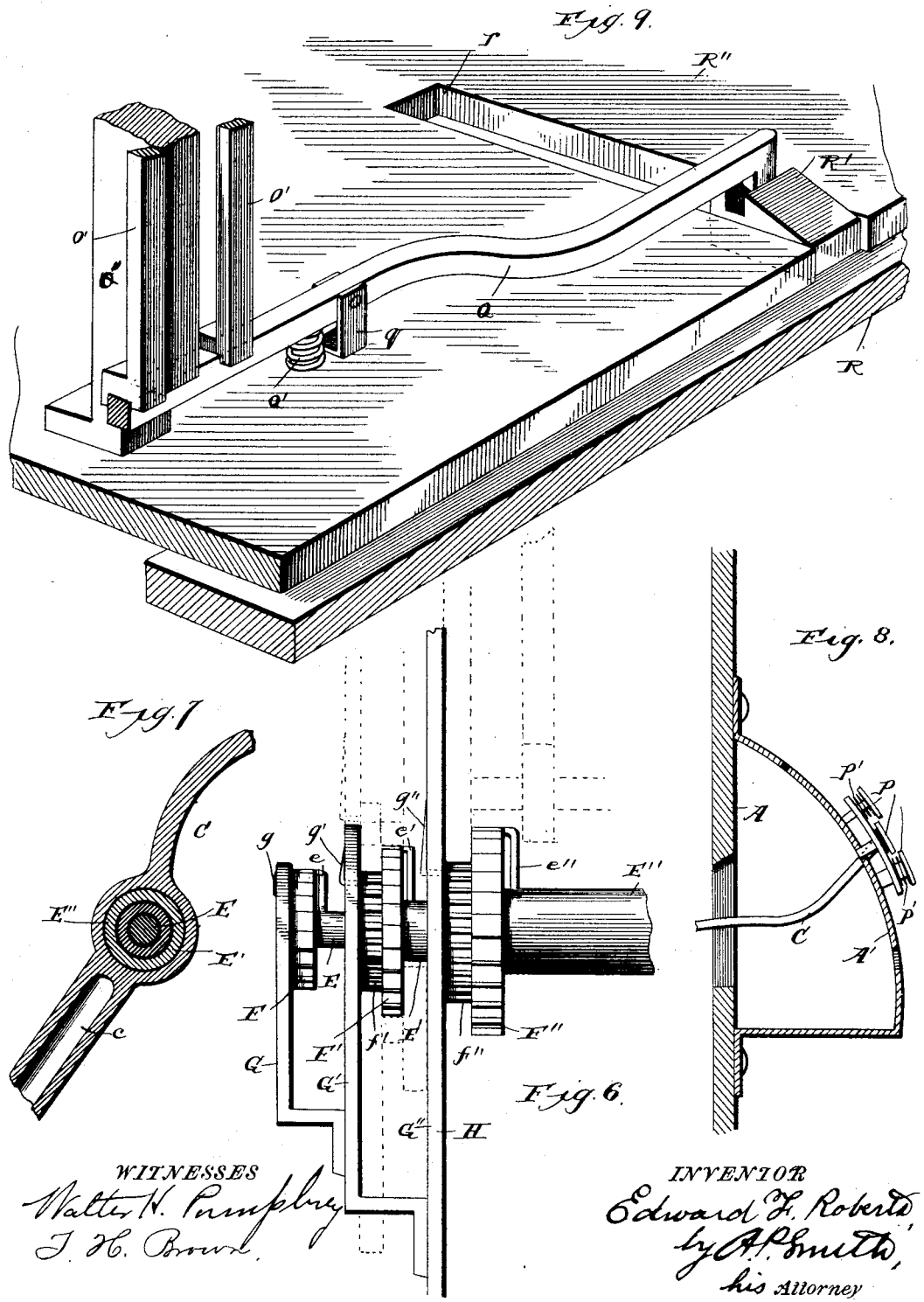
WITNESSES
INVENTOR
Edward F. Roberts
by A. P. Smith,
his Attorney (No Model.)
9 Sheets—Sheet 4.

E. F. ROBERTS.
CASH REGISTER AND INDICATOR.

No. 481,824. Patented Aug. 30, 1892.

WITNESSES
Walter H. Pumphrey
T. H. Brown

INVENTOR
Edward F. Roberts
by A. P. Smith
his Attorney (No Model.) 9 Sheets—Sheet 5.
E. F. ROBERTS.
CASH REGISTER AND INDICATOR.

No. 481,824. Patented Aug. 30, 1892.

WITNESSES
Walter H. Pumphrey
J. H. Brown

INVENTOR
Edward F. Roberts
by A. P. Smith,
his Attorney (No Model.)　　　　　　　　　　　　　　9 Sheets—Sheet 6.
E. F. ROBERTS.
CASH REGISTER AND INDICATOR.
No. 481,824.　　　　　　　　　Patented Aug. 30, 1892.
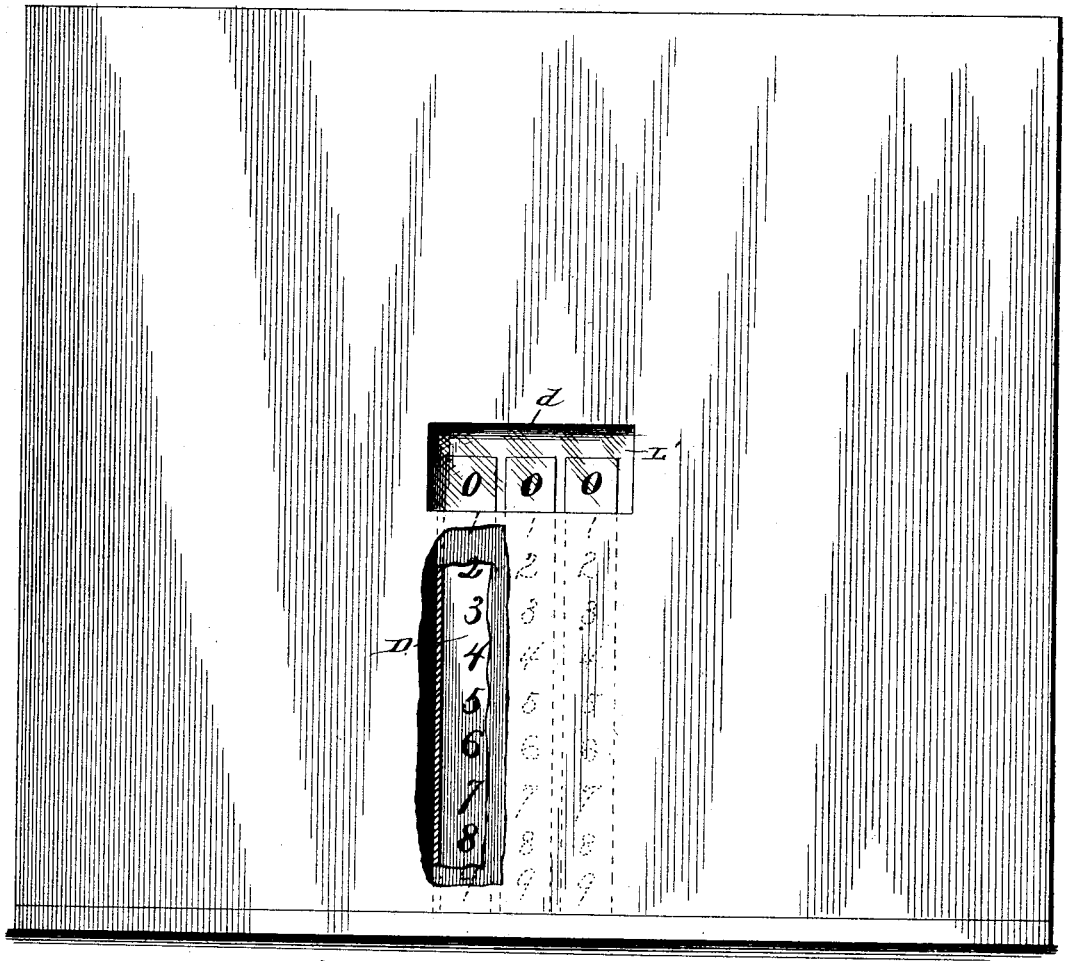
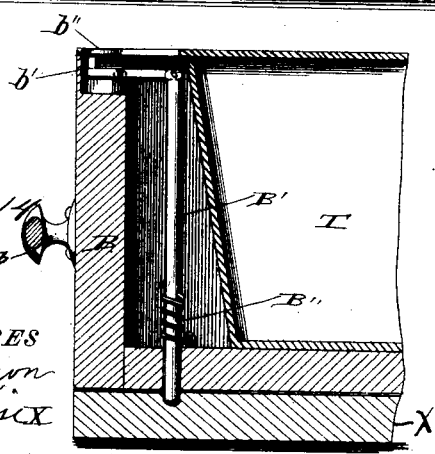
WITNESSES　　　　　　　　　　　　　　INVENTOR
　　　　　　　　　　　　　　　　　　　Edward F. Roberts
　　　　　　　　　　　　　　　　　　　by A. P. Smith
　　　　　　　　　　　　　　　　　　　　his Attorney
THE NORRIS PETERS CO., PHOTO-LITHO., WASHINGTON, D. C.

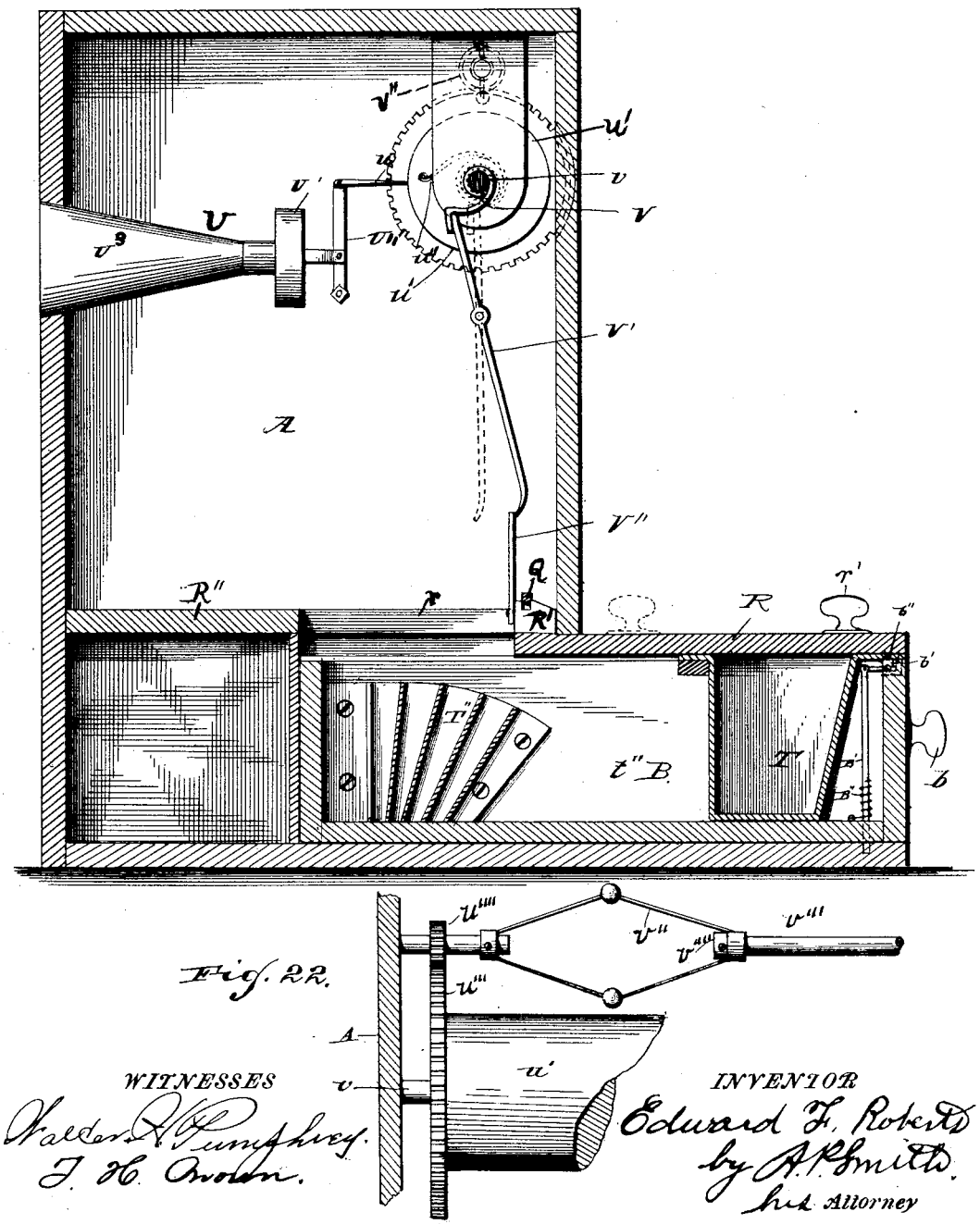

(No Model.) 9 Sheets—Sheet 8.
E. F. ROBERTS.
CASH REGISTER AND INDICATOR.

No. 481,824. Patented Aug. 30, 1892.

WITNESSES
INVENTOR
Edward F. Roberts
by A. P. Smith
his Attorney

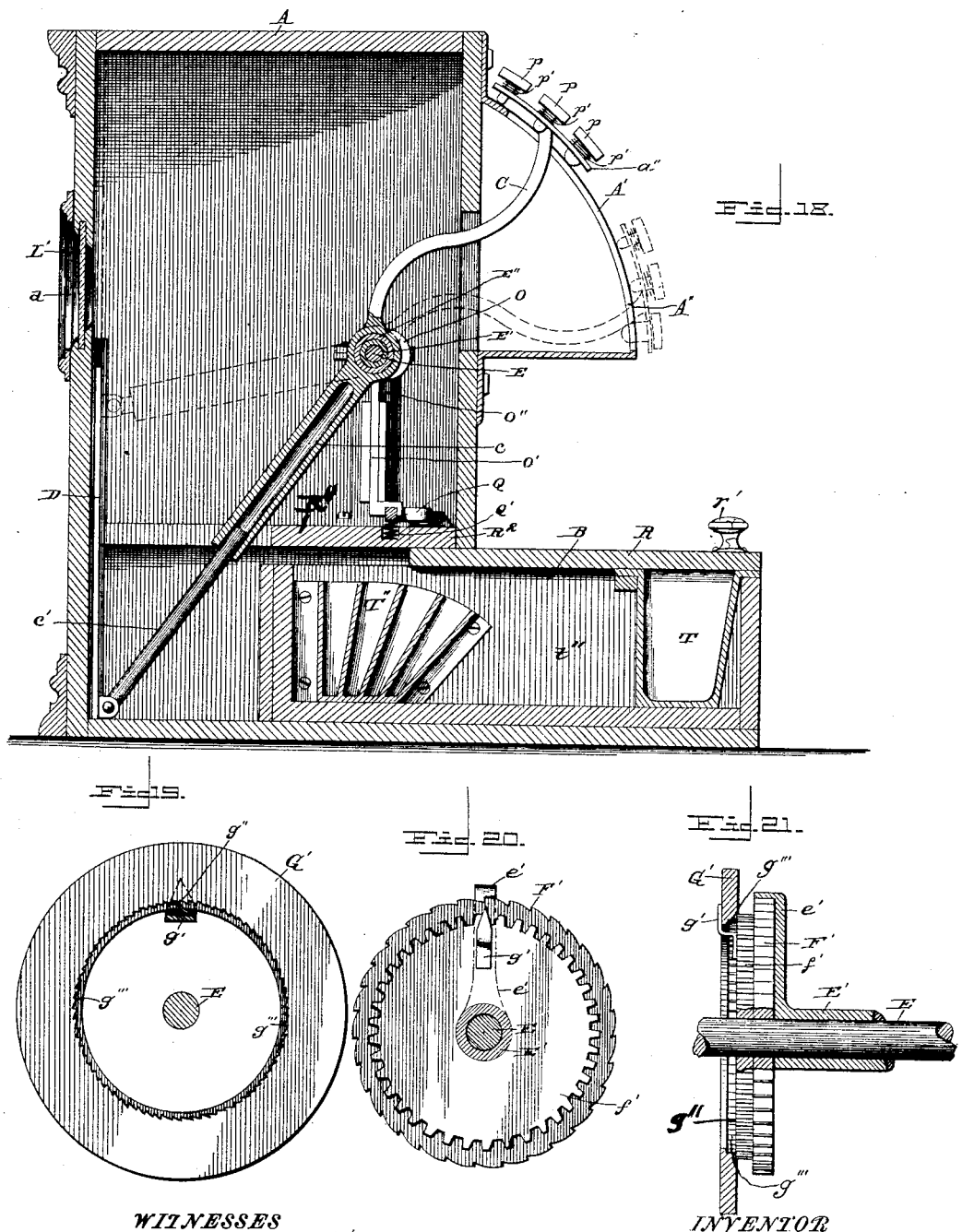

UNITED STATES PATENT OFFICE.

EDWARD F. ROBERTS, OF ROCHESTER, NEW YORK, ASSIGNOR, BY DIRECT AND MESNE ASSIGNMENTS, TO THE ROBERTS MANUFACTURING COMPANY, OF OHIO.

CASH REGISTER AND INDICATOR.

SPECIFICATION forming part of Letters Patent No. 481,824, dated August 30, 1892.

Application filed July 16, 1889. Serial No. 317,679. (No model.)

*To all whom it may concern:*

Be it known that I, EDWARD F. ROBERTS, a citizen of Great Britain, residing at Rochester, in the county of Monroe and State of New York, have invented certain new and useful Improvements in Cash Registers and Indicators; and I do hereby declare the following to be a full, clear, and exact description of the invention, such as will enable others skilled in the art to which it appertains to make and use the same.

This invention is an improved cash register, indicator, and annunciator; and its object is to provide a machine which will indicate the amount of each sale by visual signs, register the total of all the sales, and enunciate each sale by means of a coacting phonograph controlled directly or indirectly by the means employed for operating the registering and indicating mechanism and which can be utilized to vocalize the character or kind of sale, as "cash," "credit," &c., or to attract the attention of the customer on the operation of the register by announcing "Take your change," "Have you purchased 'Sapolio,'" &c., the phonograph being adapted to enunciate any word or sentence desired for advertising or other purposes, so as to direct the attention of the customer to some specialty, thus making the phonograph a very valuable adjunct to and part of the register.

Further objects are to simplify the indicating mechanism and to improve the construction of the drawer-controlling devices.

My invention therefore consists in the improved cash register and indicator hereinafter to be described and claimed, together with the combination of the same with a suitable money-drawer and a phonograph for making any particular announcement in connection with or in explanation of the operation of the cash-register.

Figure 11:
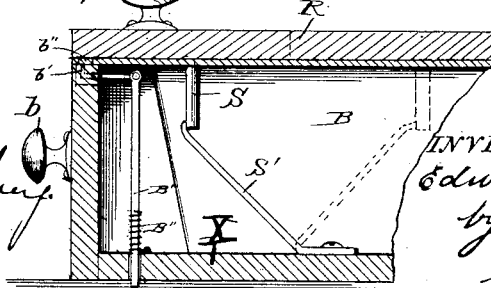
Figure 12:
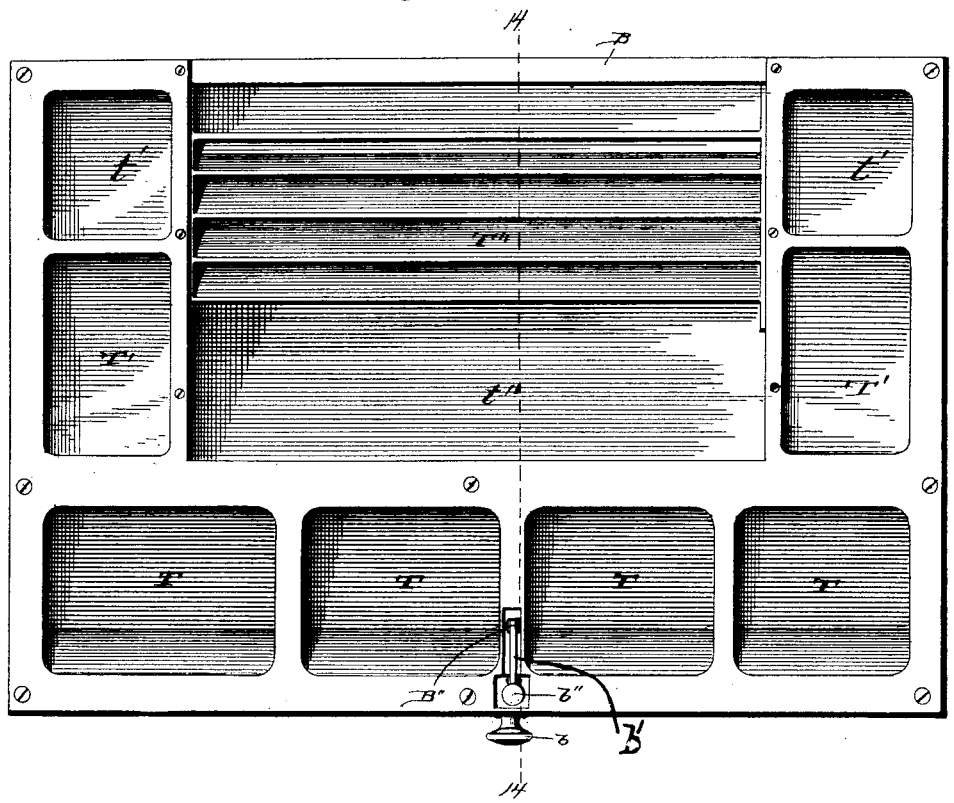
Figure 13:
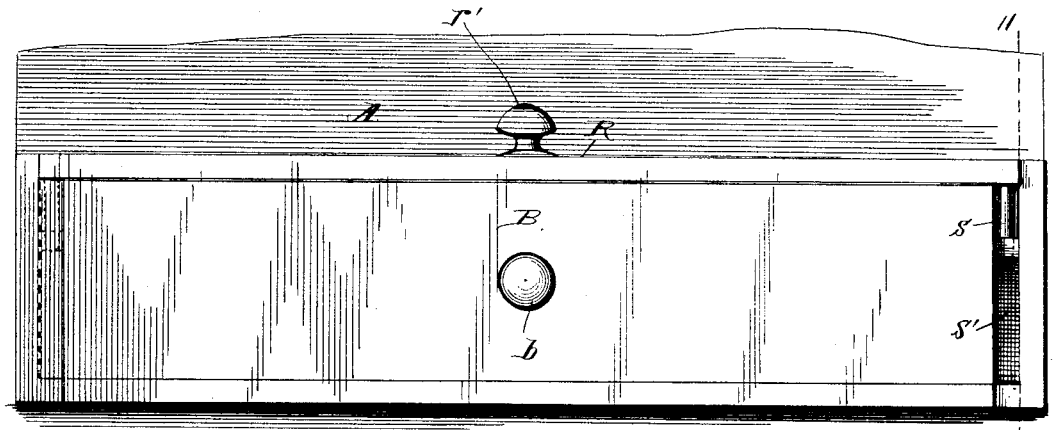
Figure 17:
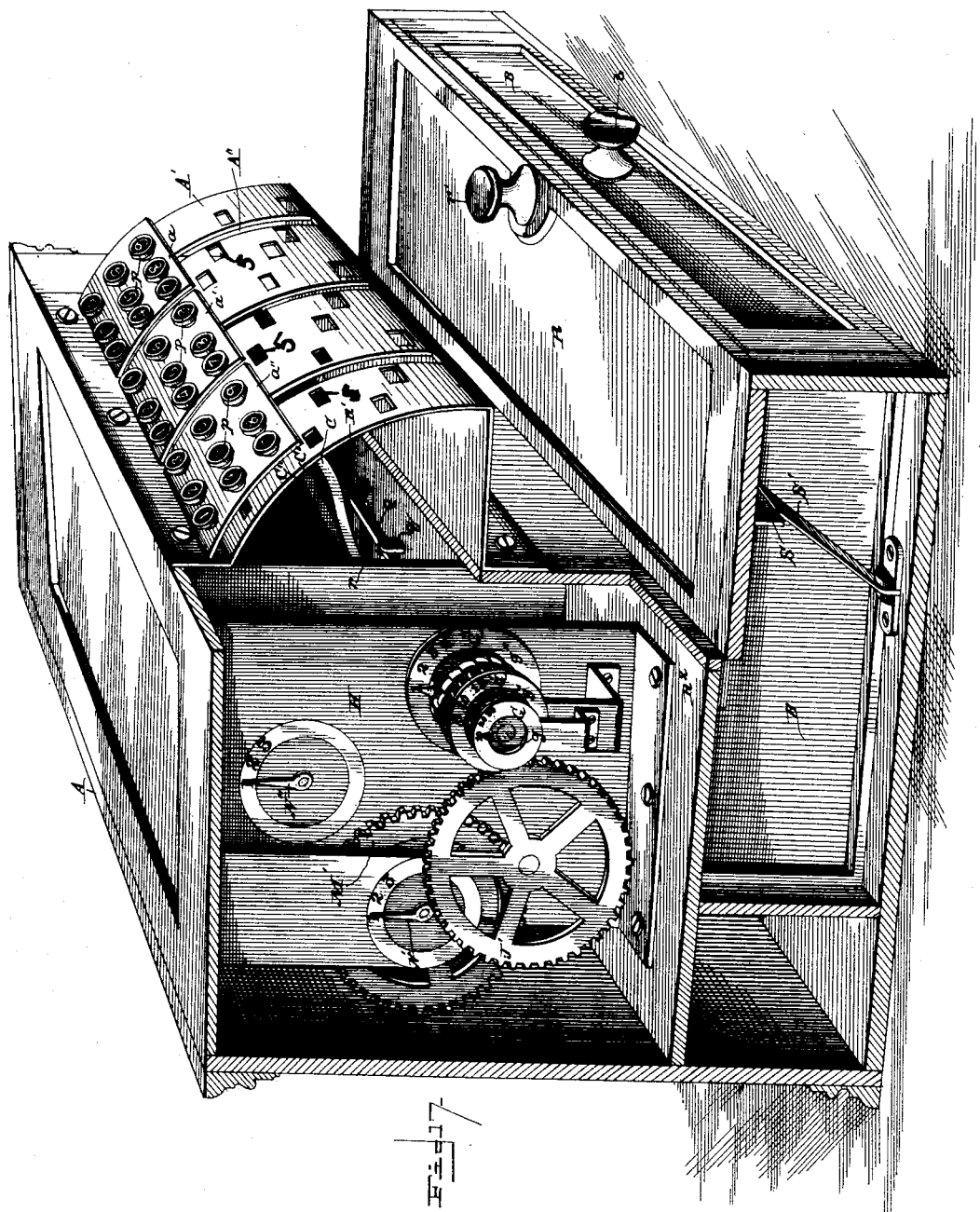

In the drawings, Figure 1 is a vertical section through the casing of the cash-register on the line 1 1 of Fig. 4, showing the registering and indicating mechanism, together with the money-drawer. Fig. 2 is a detailed view in section of the ratchet-gearing for the registering mechanism. Fig. 3 is a detailed view, partly in section, of the catch-releasing mechanism for the money-drawer cover. Fig. 4 is a vertical section through the casing on the line 4 4 of Fig. 1. Fig. 5 is a detailed view in section of the curved shield, together with plates containing the plungers which operate in connection therewith. Fig. 6 is a detailed view of the ratchet-gearing, also shown in Fig. 2. Fig. 7 is a sectional detailed view on the line 7 7 of Fig. 4. Fig. 8 is a sectional detailed view showing the curved shield, together with one of the actuating-levers, together with the stop for the same in operative position. Fig. 9 is a detailed perspective view showing the catch-releasing mechanism for the money-drawer cover. Fig. 10 is a horizontal sectional view on the line 10 10 on Fig. 4. Fig. 11 is a detailed sectional view on the line 11 11 of Fig. 13. Fig. 12 is a plan view of the money-drawer. Fig. 13 is a front view of the money-drawer and its surrounding portion of the case, the latter being partly removed. Fig. 14 is a detailed section on the line 14 14 of Fig. 12, showing the catch-releasing mechanism for the money-drawer. Fig. 15 is a front view of the casing with the indicating apparatus, a portion of the casing being broken away. Fig. 16 is a vertical section of the casing, showing a phonograph and one arrangement of devices whereby the phonograph is automatically operated by the operation of the cash-register or some portion thereof. Fig. 17 is a detail perspective view of the machine with one end removed, part only of the adding mechanism showing in said figure, such mechanism being clearly shown in Figs. 1, 4, 19, 20, and 21. Fig. 18 is a vertical sectional view showing the method of operating the indicating apparatus. Figs. 19, 20, and 21 are details showing the ratchet-locking mechanism, and Fig. 22 is a detail view of the governor for the phonograph.

A is the casing containing the cash-register and the indicating mechanism, the money-drawer, and phonograph.

A' is a curved shield attached to the front of the casing A and having suitable vertical slots A'', (see Fig. 17,) through which the upper ends of actuating-levers C C' and C'' protrude. These levers are mounted on shafts or sleeves E, E', and E'', as shown in Figs. 2, 4, and 6. The lower ends of the levers C, C', and C'' are hollow, being provided with longitudinally-bored-out portions $c$, within which slide the extension-rods $c'$, as shown in Figs. 1 and 10. Each extension-rod $c'$, which with the portion $c$ forms a telescoping connection, is pivoted at its lower end to a vertically-reciprocating indicating-strip D, as shown in Figs. 1 and 10, which indicating strip or strips (for there is one of these strips for each lever C, C', and C'') are provided with the printed numerals "1" to "9" upon their faces, as shown in Fig. 15.

In an opening $d$ in the casing, behind which opening the indicating strips D are reciprocated by the action of the telescoping levers, are placed one or more magnifying-lenses L', through which the numerals printed upon the indicating-strips will be visible, the object of employing such magnifying-lenses being to enable the indicating-strips and the figures thereon to be made smaller, thereby reducing the extent of motion necessary in the operation of the registering and indicating mechanisms.

Upon the shaft E is mounted a ratchet-wheel F, which turns freely thereon and which has an index-finger $g$, that rotates before the dial G, as shown in Fig. 1. This ratchet-wheel is engaged by a dog $e^7$, fixed to dial G, (see Fig. 2,) which prevents the ratchet-wheel turning backward; but ratchet F is turned forward with the shaft by means of a spring-finger $e$ on the upper end of an arm $e^8$, fixed to shaft E beside ratchet F, which consequently will only rotate when the shaft E is turned in one direction. In the same manner the sleeves E' and E'' are provided with ratchet-wheels F' and F'', which are operated in a similar manner by spring-fingers $e'$ and $e''$ and have index-fingers $g'$ and $g''$, moving before dials G' and G''.

In order to prevent the ratchet-wheels—such as F' F''—and the index-finger and gearing connected thereto from turning backward when its controlling-lever C is raised, I employ any suitable pawl-locking arrangement—such as that illustrated in Figs. 19, 20, and 21—in which the pawl $g''$ catches in the teeth of the internal gear $g'''$ on the inner perimeter of the dial G' and prevents the index-finger $g'$ and all the gearing connected therewith from slipping or turning backward. In addition, the ratchet-wheels F' and F'' have rigidly attached to them gear-wheels $f'$ and $f''$, which, as shown in Figs. 1 and 4, mesh with the larger gears J' and J'', which are mounted upon suitable studs and have rigidly attached to them the pinions K' and K''. These latter pinions in turn mesh with larger gear-wheels M' and M'', which have rigidly attached to them the index-fingers N' and N'', which revolve before suitable dials, as indicated in Fig. 1, (gears J' J'' not being shown in Fig. 17, because they are behind partition H'', and are clearly shown in other figures.)

Upon the ends of the levers C, C', and C'', which protrude through the slots A'' in the curved shield A', are mounted suitable plates $a\ a'\ a''$, in which plates are mounted suitable keys or plungers $p\ p$, which are normally retracted or pressed outwardly by springs $p'\ p'$. These plungers are marked "1," "2," "3," "4," "5," &c., up to "9," there being nine of them to each one of the three plates $a, a'$, and $a''$. These plungers are of suitably-graduated sizes to correspond to the holes 1, 2, 3, 4, 5, 6, 7, 8, and 9 in the curved shield A'.

The money-drawer B (shown in Figs. 1, 12, and 13) consists of the compartments T in its forward portion for small change, the compartment T' in its middle portion for silver dollars, and the still more remote compartment $t'$ for such rarely-used coins as two and three cent pieces, and the compartment T'', arranged partly in fan shape for bills of higher denomination, while the compartment $t''$ is to be used for one-dollar bills. This money-drawer has a sliding cover R, which is normally locked in place by latch Q, (see Figs. 4 and 9,) dropping in the recess R', cut in a block attached to the cover R. This block moves back and forth in the slot $r$, cut in the partition $r''$, which separates the money-drawer from the portion of the casing which contains the registering and indicating mechanism. The latch Q is pivoted in the support $q$ and normally has its end farthest from the notch R' forced up by the spring Q'. When any one of the levers C C' C'' is pressed downward, however, and the sleeve or shaft on which it is mounted rotated, a cam O, (see Fig. 3,) which is attached to the inner ends of the shaft and sleeves, as shown in Fig. 4, depresses a plunger $o'$, which forces one end of the latch Q downward, thereby lifting the other end of said latch, thus releasing the cover and permitting it to be slid back and the compartments T of the money-drawer to be exposed. This cover can be slid back by means of the handle or knob $r'$, or it may be automatically done by means of the spring S', operating against the lug S upon the cover R and tending to assume the position shown in dotted lines in Fig. 11.

When it is desired to get at the compartments T''', the money-drawer B may be drawn out by knob $b$ and these compartments exposed, the plunger B' first having been lifted out of engagement with the recess in the bottom of the casing X by means of the lever $b'$ and the thumb-piece $b''$, attached to the same, as shown in Figs. 11, 12, and 14. When pressure is removed from the thumb-piece $b''$, the plunger B' is forced downward by means of the spring B''.

U, Fig. 16, indicates a phonograph, which may be of any suitable construction, and I have merely shown a conventional representation of an amplifying-phonograph, as its particular mechanical construction forms no part of my present invention, it being my intention to employ phonographs now in the market, but to control them directly or indirectly by the means employed for operating the registering and indicating mechanisms or drawers, so as to render the operation of the phonograph synchronous with the operation of the cash-registering machine.

The phonograph is preferably mounted above the drawer and at the side of the machine opposite the registering devices.

$U^3$ is the mouth piece, and U' the vibrating diaphragm of the same, which is controlled through the amplifying-lever U''.

$u'$ is the phonogram-record cylinder mounted on a shaft $v$ and which should be connected to suitable mechanism to give it a rotative speed when released sufficient to cause the reproduction of the sound-waves recorded thereon.

$u$ is the stylus, connected to the end of the upright lever U'' and transmitting movement thereto from the record.

As shown, the shaft is rotated in one direction by a spring $u''$, but is thrown back to its normal position by means of a pivoted lever V', one end of which engages a crank-arm V on the shaft and its other end is engaged by a stud V'', fixed to the block R' or other point on the sliding drawer-top, so that when the latter is thrown inward the phonogram-record is released and operates and when the top is drawn outward the phonogram-record is thrown back to normal position.

In practice the record-cylinder would be driven by amplifying-gearing from the shaft $v$ in a construction similar to that indicated in the drawings, so that a partial revolution of the shaft would impart several revolutions to the cylinder.

Any suitable means should be provided for throwing the stylus out of contact with the cylinder when the latter is being shifted back to normal position.

I contemplate limiting the number of sounds made by the phonograph and shifting it independently of the keys, but controlling it from the drawer, so that, for instance, if a cash sale be made the operator will first depress the key to indicate the amount of sale and release the sliding cover R, and thereupon the latter may be moved inward, so as to open the drawer and release the phonograph, whereupon the latter enunciates the word "cash," calling the attention of the customer or the proprietor thereto. The utility of the combination of phonograph and register is so apparent and the special uses of the phonograph in this connection so multitudinous and various that further description is deemed unnecessary herein.

In Fig. 22 is illustrated one form of governor which may be used in connection with the phonograph attached to my apparatus, although any form of governor as well as any construction of phonograph can be equally well used. The gear-wheel $u'''$ is attached to the phonograph-cylinder $u'$ or mounted upon the same axis as the said cylinder, so that it will revolve therewith. The pinion $u''''$, mounted on an arbor which is journaled in the casing A in any suitable way, meshes with said gear-wheel $u'''$ and revolves the arbor $u''''$, by which the governor $v''$ is revolved. This governor is the usual ball-governor and the other ends of its joint-arms are attached to a collar which revolves about the stud $v'''$ and by friction of the cap $v''''$ at the end of said stud acts as a brake on the governor and causes it and the entire phonograph apparatus to revolve at a uniform speed. Any tendency to accelerate the speed drives the governor-balls out, increases the friction against the cap $v''''$, and thereby reduces the speed to normal again.

The operation of the invention is as follows: When it is desired to register the amount of any particular purchase, the corresponding plungers (shown in Fig. 5) which shall represent the dollars, dimes, and cents, which together make up the amount of the purchase, are pressed down by the operator and the respective levers C C' C'' are vibrated until the plunger in the plate attached to that lever comes opposite the corresponding opening in the curved shield A'. When this occurs, the plunger which is being pressed down will enter its corresponding opening—that is to say, the plunger "5" will enter the hole 5—and the further vibration of the lever will be prevented. It should be understood, of course, that the holes 1 2 3 4, &c., and their plungers gradually increase in size, so that as the lever travels downward the plunger "9" will slide over the holes 3 and 6 and only drop into the hole numbered 9. The effect of the more or less extended vibration of one of the levers, as C, is first to lift the indicating-strip D attached to the said lever until the number corresponding to that of the plunger being pressed down appears opposite the opening $d$ in the casing. It results from that that the amount of the purchase in dollars, dimes, and cents will be shown by the figures visible through the lenses in the opening $d$, and a second effect of the vibration of the lever is to cause the corresponding ratchet-wheel F, F', or F'' to rotate through a distance corresponding to the extent of vibration of the lever and thereby move the index-fingers $g$, $g'$, and $g''$ to the proper position to register the amount added by the purchase which is to be indicated and registered.

The object of the reducing-gearing and the second index-fingers N' and N'' (shown in Fig. 1) is to enable the larger amounts which in the course of the day will be struck off on the apparatus for indicating the dimes and cents to be intelligently registered. The gearing is so proportioned that for every complete revolution of the index-finger $g''$ the index-finger N'' will move one place, and in the same way the index-finger N' will move one place for every complete revolution of the index-finger $g'$. The registering mechanisms of fingers N' N'' are independent. As the number of dollars registered during the day will be materially less than the dimes and cents, it may not be necessary to have such a reducing-gear attached to the mechanism which operates the index-finger g, and I have not illustrated any such, though one can obviously be employed if it should be found necessary. At the end of the day or at any desirable time the amount of all the purchases registered can be obtained by adding together the amounts indicated on the several dials by their index-fingers g, g', and g'', N and N''. The vibration of any one of the levers C, C', and C'' will evidently force downward one of the plungers O' through the agency of the cam O, (see Fig. 4,) and thereby lift the latch Q and permit of the shoving back of the top R by the spring S, thereby disclosing the compartments in the forward part of the money-drawer and simultaneously releasing the phonograph mechanism, with the effect described. It is preferable to have a spring S at each side of the money-drawer, as is shown in Fig. 13, where the spring at the left-hand side is shown in dotted lines, while that on the right-hand side is shown in full lines, a portion of the casing which would otherwise hide it being removed.

When it is desired to expose the entire money-drawer, the said drawer can be drawn outward by hand after pressing downward upon the thumb-piece b'' to unlock it.

The phonograph, as indicated in Fig. 16, would be released by the shoving in of the cover R, and upon the partial rotation of the cylinder u' which would follow the phonograph would make any desired announcement in the manner described calculated to draw the attention of the customer to the operation of the cash-register on the closure of the money-drawer. By pulling out the cover again the cylinder u' would be rotated back against the resistance of the spring u'' by means of the lever V' and its connections and would be placed in position for a repetition of the operation. After the amount of each particular purchase has been indicated and registered and the fact annunciated or other announcement made, as above described, the operator removes the pressure from the various numbered plungers and the levers C C' C'' are thereby released and resume their normal positions on account of the weight of the indicating-strips D and the ends of the levers to which they are attached. This of course does not affect the ratchet-wheels F F' F'', inasmuch as the spring-fingers e, e', and e'' slide back over them and drop into position for the next operation of the registering devices.

It should be understood that the upper ends of levers C and C'' are bent twice at right angles, so as to get the necessary distance between them and the lever C', in order that there may be room for the plates a a' a''.

A removable panel or door Y is also put in the side of the casing, on opening which the amounts registered on the various dials may be read off.

Having thus fully described my invention, what I claim, and desire to secure by Letters Patent of the United States, is—

1. In a cash-register, the combination of the casing, the reciprocating indicating-strip, the telescoping lever, and the finger keys or plungers on the outer end of said lever, substantially as described.

2. In a cash-register, the combination of the actuating-lever, the curved shield having a slot through which said lever protrudes and perforations of graduated sizes, with suitable keys or plungers of corresponding sizes attached to the actuating-lever and adapted to engage with the said perforations, substantially as described.

3. In a cash-register, the combination of the actuating-lever, the curved shield having a slot through which said lever protrudes and perforations of graduated sizes arranged in rows parallel to the slot, a plate attached to said lever, and spring-controlled keys or plungers which on being pressed against the curved shield drop into certain of the perforations as the actuating-lever is vibrated, substantially as described.

4. In a cash-register, the combination of the indicating mechanism, the registering mechanism, the lever for operating the said mechanisms, the curved shield having a slot through which said lever protrudes, and perforations of graduated sizes, together with suitable keys or plungers of corresponding sizes attached to the lever and adapted to engage with the said perforations, substantially as described.

5. In a cash-register, the combination of the casing, the indicating-strip moving before an opening in said casing, the telescoping lever for operating said strip, a shield having a slot through which said lever protrudes, and depressible keys or plungers connected with said lever, by which its vibrations in said slot are limited at the will of the operator, substantially as described.

6. The combination, in a cash-register, of mechanism for registering the amount of each sale with a phonograph and mechanism whereby said phonograph is operated upon the shifting of the registering mechanism and announces the operation of the register, substantially as described.

7. The combination, in a cash-register and annunciator, of mechanism for indicating the amount of each sale and for registering the amount thereof with a phonograph and means whereby the phonograph is actuated when the indicating or recording mechanism is shifted and announces the operation of the register, substantially as described.

8. In a cash-register, the combination of the indicating devices and the lever for shifting the same with a phonograph adapted to announce each operation of the indicating device and mechanism for controlling the same, released upon the shifting of said lever, substantially as described.

9. In a cash-register, the combination of the indicating mechanism and registering mechanism and the levers for controlling the same with a prepared phonograph-record and a reproducer and the devices for controlling the same, released upon the shifting of either of said levers, and means for returning the same to normal position, substantially as described.

10. In a cash-register and annunciator, the combination of the indicating devices, the levers for shifting the same, and the sliding piece or drawer and the latch therefor operated by said levers, with a phonograph, its record-cylinder, and the actuating mechanism thereof released by the movement of said sliding piece when the latter is released, substantially as described, and means for returning the cylinder to normal position upon the return of said sliding piece to normal position, substantially as set forth.

11. The combination of the sliding drawer-top, its latch, and the lever for releasing the same with the phonograph, the mechanism for revolving the phonograph-record cylinder, and means, substantially as described, whereby the phonograph-cylinder revolves and its record is announced upon the movement of the top in one direction and the cylinder thrown back to normal position by the opposite movement of the top, substantially as described.

In testimony whereof I affix my signature in presence of two witnesses.

EDWARD F. ROBERTS.

Witnesses:
   G. W. BALLOCH,
   A. P. SMITH.